United States Patent
Edgington et al.

(10) Patent No.: US 11,897,557 B2
(45) Date of Patent: Feb. 13, 2024

(54) TRACK ASSEMBLY VIBRATION LIMITING SYSTEM AND METHOD

(71) Applicant: DEERE & COMPANY, Moline, IL (US)

(72) Inventors: Jason Edgington, Waterloo, IA (US); Christian P. Hellman, Waterloo, IA (US)

(73) Assignee: DEERE & COMPANY, Moline, IL (US)

(*) Notice: Subject to any disclaimer, the term of this patent is extended or adjusted under 35 U.S.C. 154(b) by 324 days.

(21) Appl. No.: 17/211,173

(22) Filed: Mar. 24, 2021

(65) Prior Publication Data
US 2021/0371021 A1 Dec. 2, 2021

Related U.S. Application Data

(60) Provisional application No. 63/033,465, filed on Jun. 2, 2020.

(51) Int. Cl.
*B62D 55/096* (2006.01)
*B62D 55/112* (2006.01)

(52) U.S. Cl.
CPC ........ *B62D 55/0963* (2013.01); *B62D 55/112* (2013.01)

(58) Field of Classification Search
CPC .. B62D 55/096; B62D 55/0963; B62D 55/12; B62D 55/112; B60B 15/28
See application file for complete search history.

(56) References Cited

U.S. PATENT DOCUMENTS

| | | | |
|---|---|---|---|
| 3,578,822 A | 5/1971 | Slemmons | |
| 3,680,651 A * | 8/1972 | Termont | B60B 15/28 180/9.62 |
| 6,132,007 A * | 10/2000 | Harmsen | B60B 15/28 301/53.5 |
| 6,283,556 B1 * | 9/2001 | Taylor | B60B 15/28 301/53.5 |
| 8,746,815 B2 | 6/2014 | Reshad et al. | |
| 2013/0026819 A1 * | 1/2013 | Reshad | B62D 55/12 305/135 |

FOREIGN PATENT DOCUMENTS

| | | |
|---|---|---|
| EP | 0624737 A1 | 11/1994 |
| EP | 0816126 A1 | 1/1998 |
| WO | WO2018200249 A1 | 11/2018 |

OTHER PUBLICATIONS

German Search Report issued in application No. DE102021114231. 8, dated Feb. 7, 2022, 9 pages.
Merhof, W.; Hackbarth, E.-M. (Ed.), Tracks Vehicle Drive Mechanics, dated Dec. 2015, ISBN 978-3-943207-13-2, <URL:http://athene-forschung.unibw.de/doc/111331/111331.pdf>, pp. 1-547.

* cited by examiner

*Primary Examiner* — S. Joseph Morano
*Assistant Examiner* — Emily G. Castonguay
(74) *Attorney, Agent, or Firm* — Taft Stettinius & Hollister LLP; Stephen F. Rost

(57) ABSTRACT

A work machine includes a drive wheel, a drivable track engaged with the drive wheel, a deformable spacer coupled to the drive wheel, and a secondary weight coupled to the deformable spacer. The deformable spacer facilitates oscillation of the secondary weight relative to the drive wheel to limit vibrations of the work machine.

20 Claims, 7 Drawing Sheets

US 11,897,557 B2

TRACK ASSEMBLY VIBRATION LIMITING SYSTEM AND METHOD

RELATED APPLICATIONS

This application claims priority to U.S. Provisional Application Ser. No. 63/033,465, filed Jun. 2, 2020, the disclosure of which is hereby incorporated by reference in its entirety.

FIELD OF THE DISCLOSURE

The present disclosure relates to machinery with a drive assembly, and more particularly to a secondary weight for use with a drive wheel of the drive assembly.

BACKGROUND

Work machines and in particular agricultural work machines may have continuous drivable tracks for propelling the work machine. Each drivable track may be in tension. The drivable track is often driven by a drive wheel. The drive wheel is rotatably driven by a primary mover such as an engine, and the drive wheel is engaged with drivable track to drive rotation of the drivable track. These actions and interactions may contribute to vibration or oscillation of the drivable track and the work machine. What is needed therefore is a system and method for preventing, counteracting, or limiting (i.e. offsetting) the vibration or oscillation of the drivable track and/or the work machine. This may be advantageous for the comfort of the operator and for the lifespan of components of the work machine.

Further, the energy output from the oscillation of the drivable track acts upon the drive wheel to cause oscillation of drive wheel. Therefore, it may advantageous to offset the oscillation of the drive wheel.

SUMMARY

In an illustrative embodiment, a work machine comprises: a drivable track; a drive wheel engaged with and configured to cause rotation of the drivable track; a retainer fixedly coupled to the drive wheel; an elastomeric spacer coupled to the retainer; and a secondary weight coupled to the elastomeric spacer. The elastomeric spacer facilitates oscillation of the secondary weight relative to the drive wheel.

In some embodiments, the secondary weight has a rotational inertia associated with a frequency of oscillation of the secondary weight; and the frequency of oscillation of the secondary weight is within a tolerance of a frequency of oscillation of the drive wheel during rotation of the drivable track.

In some embodiments, the secondary weight has a mass associated with an amplitude of oscillation of the secondary weight; and the amplitude of oscillation of the secondary weight offsets an amplitude of oscillation of the drive wheel during rotation of the drivable track.

In some embodiments, the retainer is spaced apart from the secondary weight; and at least a portion of the elastomeric spacer is positioned between the retainer and the secondary weight.

In some embodiments, the elastomeric spacer is a continuous loop extending around an axis of rotation of the drive wheel.

In some embodiments, the elastomeric spacer includes a first portion and a second portion; the first portion includes: a head, a collar having a lesser perimeter than the head, and a leg having a lesser perimeter than the collar; and the second portion includes a base having an aperture extending therethrough; and the aperture of the base is sized and shaped to receive the leg. In some embodiments, the retainer includes an aperture; and the aperture of the retainer is sized and shaped to receive the collar; the head, the collar, and the leg define a continuous aperture extending therethrough; and the continuous aperture is sized and shaped to receive a fastener configured to secure the retainer, the elastomeric spacer, and the secondary weight to each other.

In some embodiments, the drive wheel includes a first lateral edge and a second lateral edge; and the secondary weight is positioned within the first lateral edge and the second lateral edge of the drive wheel.

In another illustrative embodiment, a work machine comprises: a drive wheel; a drivable track engaged with the drive wheel; a deformable spacer coupled to the drive wheel; and a secondary weight coupled to the deformable spacer; wherein the deformable spacer facilitates oscillation of the secondary weight relative to the drive wheel. In some embodiments, the oscillation of the secondary weight offsets an oscillation of the drive wheel.

In some embodiments, the deformable spacer is comprised of an elastomeric material. In some embodiments, the deformable spacer is comprised of a viscous fluid.

In some embodiments, the work machine further comprises a controller configured to identify one or more control factors associated with a frequency of oscillation of the drivable track; and the controller is configured to actively adjust a viscosity of the viscous fluid based on the identified one or more control factors associated with a frequency of oscillation of the drivable track.

In some embodiments, the viscosity of the viscous fluid varies based on temperature.

In some embodiments, the drive track includes a first lateral edge and a second lateral edge; and the secondary weight is positioned within the first lateral edge and the second lateral edge of the drive track.

In some embodiments, the deformable spacer has a continuous loop shape and extends around an axis of rotation of the drive wheel.

In another illustrative embodiment, a method for limiting the vibrations of a work machine comprises: rotating a drive wheel engaged with a drivable track that is disposed at a tension contributing to vibrations of the work machine; and oscillating a secondary weight relative to the drive wheel to limit the vibrations of the work machine. In some embodiments, oscillating a secondary weight relative to the drive wheel includes: deforming at least a portion of a deformable spacer coupled to the drive wheel and the secondary weight.

In some embodiments, the method for limiting the vibrations of a work machine of claim 18, further comprises: determining an amplitude of oscillation of the drive wheel; and selecting a secondary weight having a desired rotational inertia based on the amplitude of oscillation of the drive wheel.

In some embodiments, deforming at least a portion of a deformable spacer coupled to the drive wheel and the secondary weight includes: adjusting the viscosity of a fluid included in the deformable spacer based on the tension of the drivable track.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and illustratively described so that others skilled in the art may appreciate and understand the principles and practices of the present disclosure.

Figure 1:
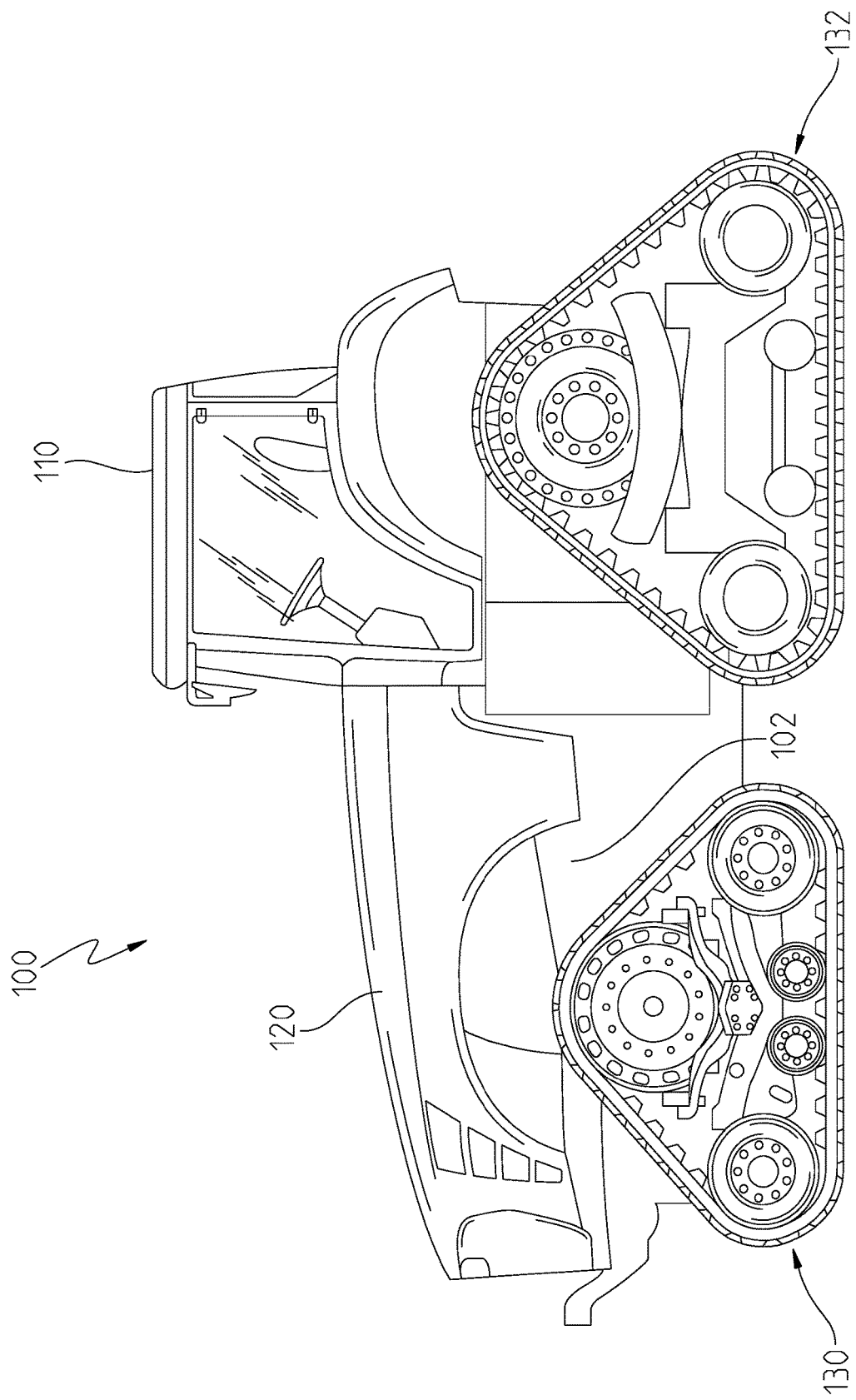
FIG. 1 illustrates a side view of a work machine with drivable tracks.

FIG. 1 illustrates an exemplary work machine 100, in this example a tractor, including a tractor frame 102, an operator cab 110, an engine compartment that holds an engine 120, front drive assemblies 130, and rear drive assemblies 132. The drive assemblies 130, 132 may be referred to as undercarriages. FIG. 1 only shows the left side of the vehicle 100 with one front track drive assembly 130 and one rear track drive assembly 132; however, the right side of the vehicle 100 also includes another front track drive assembly 130 and another rear track drive assembly 132. The tractor frame 102 supports the operator cab 110 and the engine 120. The front and rear track drive assemblies 130, 132 support the tractor frame 102 above the ground, and provide propelling force to the vehicle 100. At least the front drive assemblies 130 can be steerable to steer the vehicle 100, and alternatively, both the front and rear drive assemblies 130, 132 can be steerable to steer the vehicle 100. The tractor frame 102 supports the operator cab 110 and the engine 120. The operator cab 110 includes controls for the operator to control the engine 120 and other components of the work machine 100.

Figure 2:
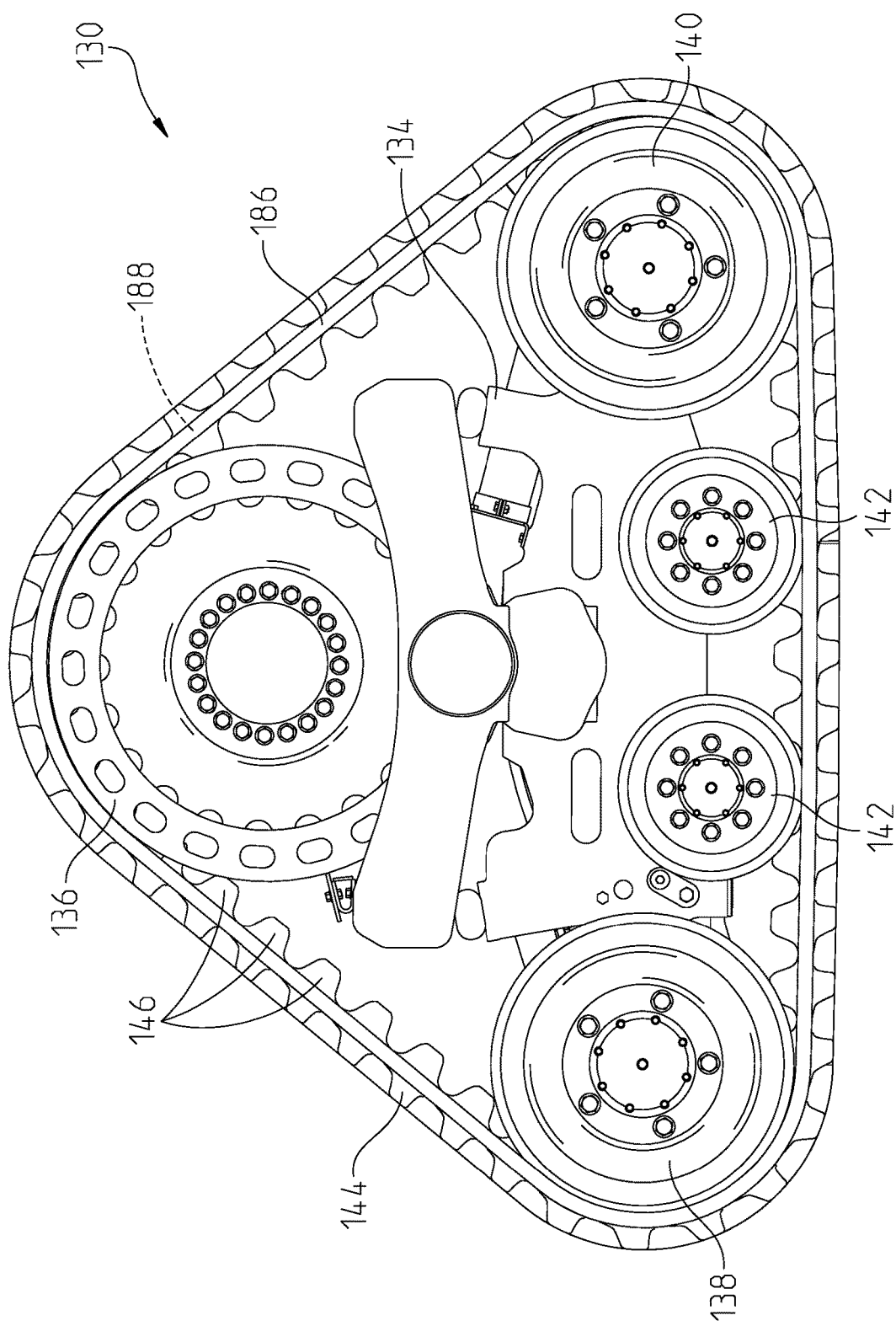
FIG. 2 illustrates a side view of a drive assembly of the work machine including a drive wheel engaged with a drivable track.

FIG. 2 illustrates a side view of a front drive assembly 130; although, it should be appreciated that the disclosure may be equally applied to a rear drive assembly 132. The drive assembly 130 includes a drive frame 134, a drive wheel 136, a front idler wheel 138, a rear idler wheel 140, mid rollers 142, and a drivable track 144. While two mid rollers 142 are illustrated in the example shown in FIG. 2, this disclosure applies to drive assemblies having any number of mid rollers 142 and any arrangement of components described above that is suitable for a drive assembly of a tracked work machine.

Referring still to FIG. 2, in the illustrative embodiment, the rear idler wheel 140 is positioned rearwardly of the front idler wheel 138, and the drive wheel 136 is positioned above the idler wheels 138, 140. The idler wheels 138, 140, the mid rollers 142, and the drive wheel 136 are coupled to the drive frame 134. Each of the idler wheels 138, 140, the mid rollers 142, and the drive wheel 136 may engage the drivable track 144. The drivable track 144 has a width extending from a first lateral edge 186 to a second lateral edge 188. In the illustrative embodiment, the idler wheels 138, 140, the mid rollers 142, the drive wheel 136, and the drive frame 134 are each positioned between the first lateral edge 186 and the second lateral edge 188 of the drivable track 144. Sometimes the drivable track 144 may be referred to as a belt.

Figure 3:
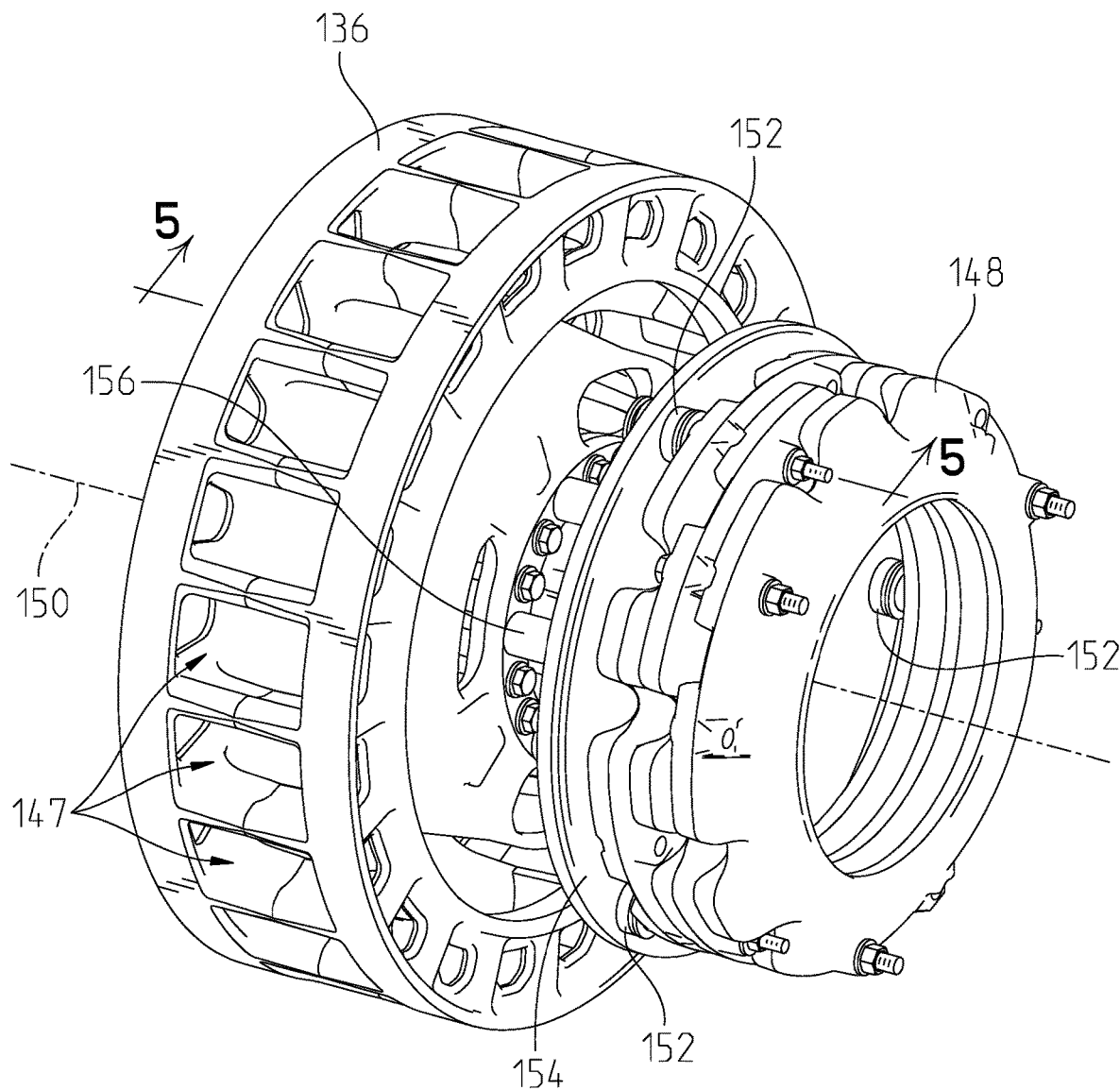
FIG. 3 illustrates a perspective view of a secondary weight coupled to the drive wheel to limit vibrations of the work machine.

Referring now to FIGS. 2 and 3, in the illustrative embodiment, the drivable track 144 includes a series of lugs 146. The lugs 146 are spaced apart a common distance from each other. The common distance and the speed at which the drive wheel 136 rotates are associated with the frequency at which the lugs 146 engage and disengage with lug-receiving apertures 147 defined in the drive wheel 136 (see FIG. 3). When the lugs 146 engage and disengage with the lug-receiving apertures 147 at certain frequencies, the drivable track 144 oscillates causing vibrations that may be felt by an operator within the work machine 100. The oscillations may also reduce the lifespan of components of the work machine 100.

Other arrangements, for example, a friction drive between the drive wheel 136 the drivable track 144 may also contribute to vibrations of the work machine 100. Therefore, it should be appreciated that the disclosure applies to any work machine 100 with drivable tracks configured to engage with and be rotated by a drive wheel 136 or similar rotational driver. In any case, energy from the oscillations of the drivable track 144 is received by the drive wheel 136 causing the drive wheel 136 to oscillate.

As shown in FIG. 3, a secondary weight 148 is coupleable to the drive wheel 136 to limit the vibrations of the work machine 100. Specifically, when the secondary weight 148 is coupled to the drive wheel 136, the secondary weight 148 oscillates relative to the drive wheel 136 to limit the vibrations of the work machine 100.

In use, a frequency of oscillation of the drive wheel 136 may be measured or determined based on a frequency of oscillation of the drivable track 144. Subsequently, a frequency of oscillation of the secondary weight 148 may be selected based on the frequency of oscillation of the drive wheel 136. The selected frequency of oscillation of the secondary weight 148 is substantially equal to (or within a tolerance of) the frequency of oscillation of the drive wheel 136.

The frequency of oscillation of the secondary weight 148 is associated with a rotational inertia of the secondary weight 148. The rotational inertia is representative of the mass of the secondary weight 148 and the distance of the mass from an axis of rotation 150 of the drive wheel 136. Thus, selecting a frequency of oscillation of the secondary weight 148 includes selecting a secondary weight 148 having a desired mass that is positioned in a desired arrangement relative to the axis of rotation 150 of the drive wheel 136. In some embodiments, the arrangement of the mass of the secondary weight 148 may be repositionable manually or electronically relative to the drive wheel 136. In some embodiments, the arrangement of the mass may be repositionable actively via a controller 200 and based on control factors associated with the frequency of oscillation of the drivable track 144. The control factors will be described in greater detail below.

The mass of the secondary weight 148 is also associated with an amplitude of oscillation of the secondary weight 148. In use, the secondary weight 148 is selected, based on its mass, to offset the amplitude of oscillation of the drive wheel 136 during rotation of the drivable track 144. The term "offsets" is used to mean diminishes, overcomes, counteracts, balances, or otherwise limits the effect of Because the mass of the secondary weight 148 affects both the frequency of oscillation and the amplitude of oscillation of the secondary weight 148, the frequency of oscillation of the secondary weight 148 may be further adjusted based on other factors, subsequent to a desired mass of the secondary weight 148 being selected.

For example, the frequency of oscillation of the secondary weight 148 may be affected by material properties of a deformable spacer 152 that facilitates oscillation of the secondary weight 148. The deformable spacer 152 and exemplary material properties thereof will be described in greater detail below.

Figure 4:
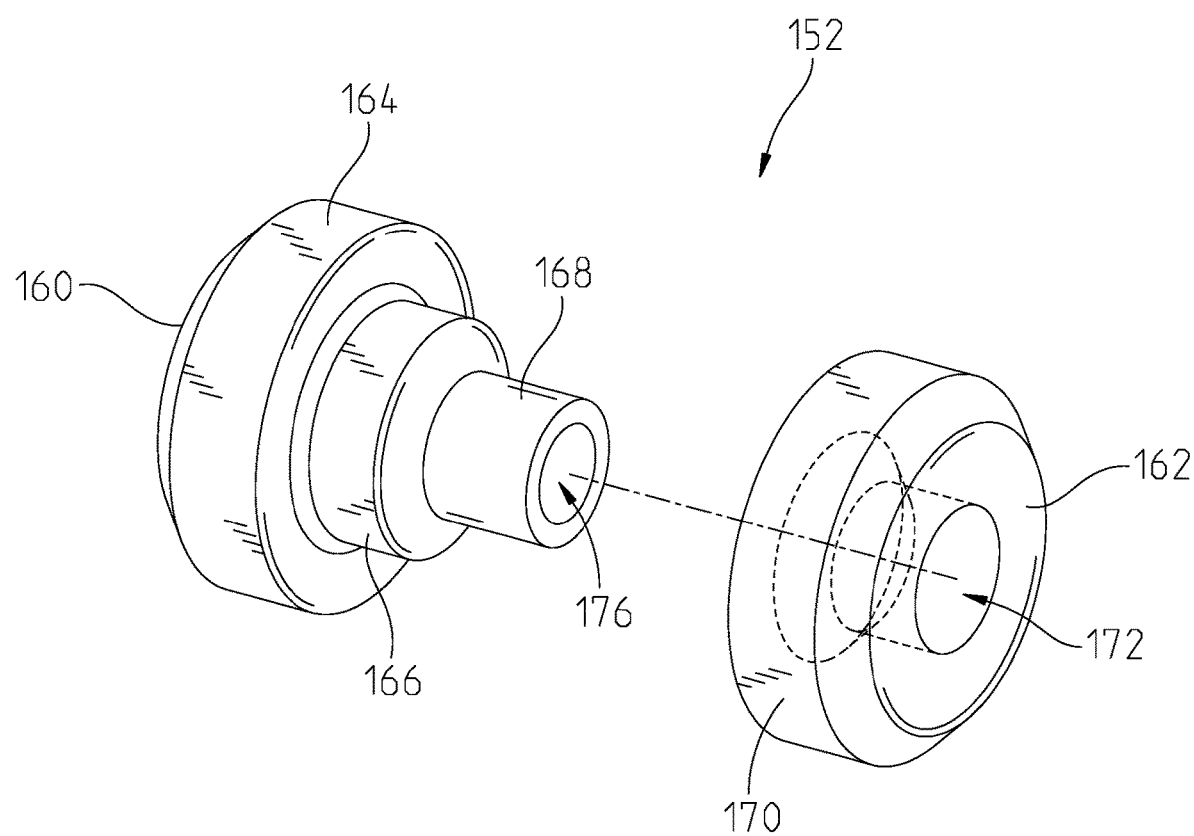
FIG. 4 illustrates an exploded perspective view of an elastomeric deformable spacer configured to facilitate oscillation of the secondary weight relative to the drive wheel.
Figure 5:
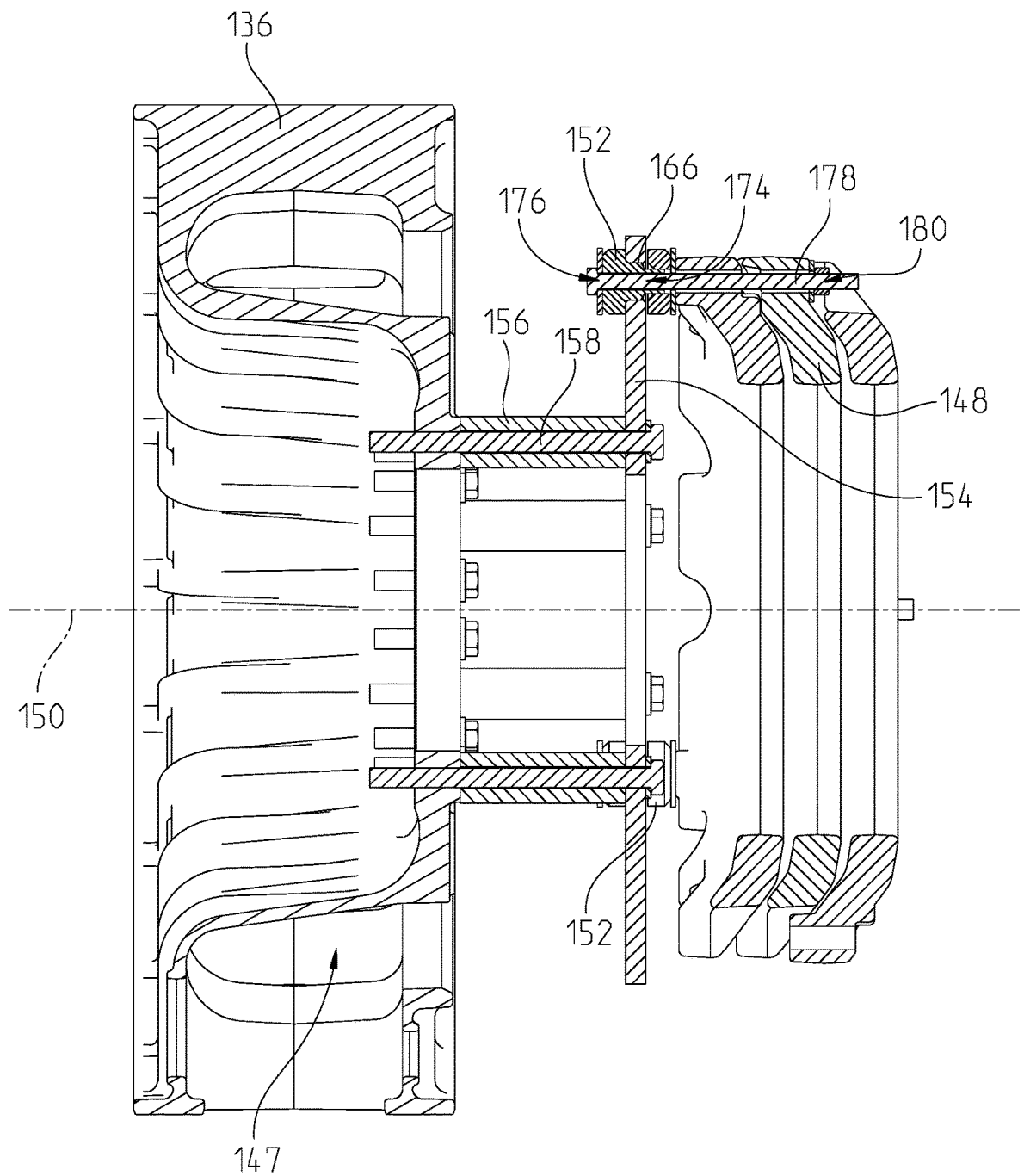
FIG. 5 illustrates a cross sectional view of FIG. 3 showing the secondary weight coupled to the drive wheel.

Referring now to FIGS. 3-5, the drive wheel 136, the secondary weight 148, and a plurality of deformable spacers 152 are shown. In the illustrative embodiment, a plate or retainer 154 is fixedly coupled to the drive wheel 136 via a plurality of struts 156. The secondary weight 148, the retainer 154, and the drive wheel 136 are each positioned such that they are centered on the axis of rotation 150 of the drive wheel 136. The deformable spacers 152 are coupled to the retainer 154. The secondary weight 148 is coupled to the deformable spacers 152. The retainer 154 is spaced apart from the secondary weight 148, and at least a portion of the deformable spacer 152 is positioned between the retainer 154 and the secondary weight 148.

As shown in FIG. 5, in the illustrative embodiment, the plurality of struts 156 are coupled to the retainer 154 and the drive wheel 136 via a corresponding plurality of fasteners 158. The fasteners 158 may be inserted through apertures defined in each of the plurality of struts 156, the retainer 154, and the drive wheel 136 to couple to components together.

In the illustrative embodiment, the secondary weight 148 includes a plurality of weighted-disks; however, in other embodiments, the secondary weight 148 is a single monolithic component. Further, in the illustrative embodiment, a plurality of deformable spacers 152 are shown; however, in other embodiments, any number of deformable spacers 152 for example, a single deformable spacer 152 may be present. In some embodiments, the deformable spacer 152 is a continuous or semi-continuous loop extending around the axis of rotation 150 of the drive wheel 136. Further still, in the illustrative embodiment, the retainer 154 is shown as a separate component from and fixed to the drive wheel 136; however, in other embodiments, the retainer 154 and the drive wheel 136 are a single monolithic component. In other words, in some embodiments, the retainer 154 is omitted, and the drive wheel 136 is coupled directly to the deformable spacer(s) 152.

Referring now to FIG. 4, the deformable spacer 152 may be comprised of elastomeric material. Further, the deformable spacer 152 may take the form of an isolator. In the illustrative embodiment, the deformable spacer 152 includes an inner portion 160 and an outer portion 162, which may be referred to as first and second portions interchangeably. The inner portion 160 includes a head 164, a collar 166, and a leg 168. The head 164, the collar 166, and the leg 168 cooperate to define a continuous aperture 176 that extends through each of the components. The collar 166 has a perimeter that is less than a perimeter of the head 164, and the leg 168 has a perimeter that is less than the perimeter of the collar 166. The outer portion 162 includes a base 170 having an aperture 172 extending therethrough. The aperture 172 of the base 170 is sized and shaped to receive the leg 168 of the inner portion 160.

As shown in FIG. 5, in the illustrative embodiment, the retainer 154 includes an aperture 174 that is sized and shaped to receive the collar 166. The continuous aperture 176 defined in the inner portion 160 is sized and shaped to receive a fastener 178. The fastener 178 is inserted in the continuous aperture 176 and in an aperture 180 defined in the secondary weight 148. In this way, the retainer 154, the deformable spacer 152, and the secondary weight 148 are secured to each other.

Figure 6:
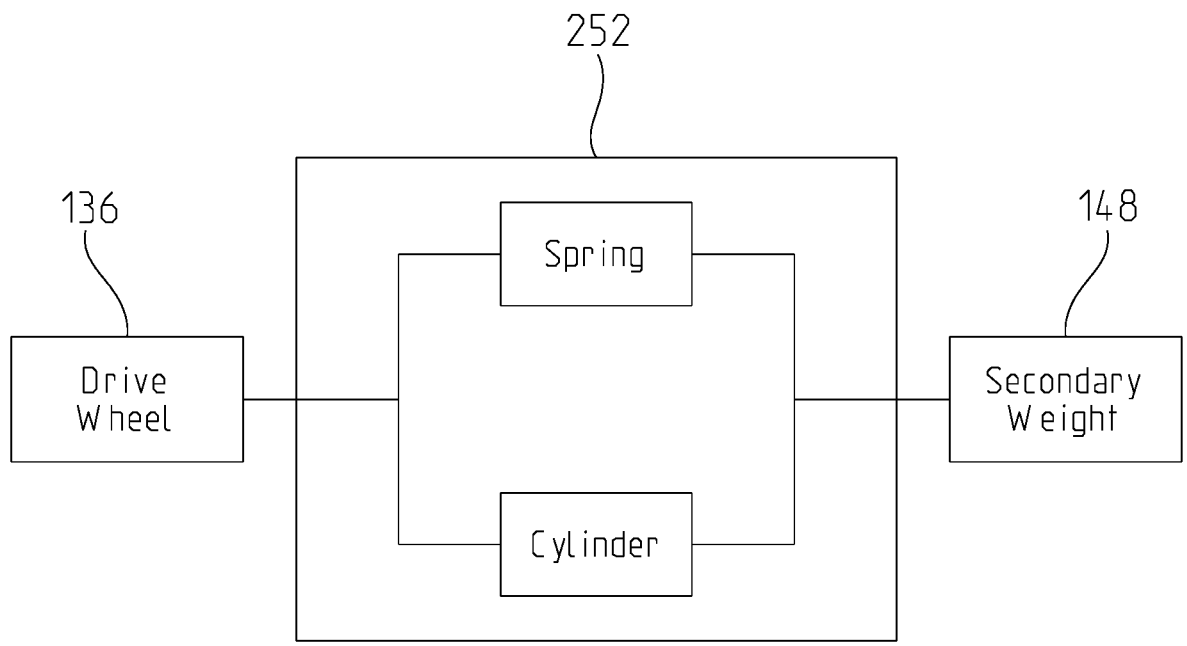
FIG. 6 illustrates a diagrammatic view including another deformable spacer configured to facilitate oscillation of the secondary weight relative to the drive wheel.

While FIGS. 3-5 illustrate the deformable spacer 152 as an elastomeric isolator, it should be appreciated that the disclosure contemplates any deformable spacer suitable for dissipating kinetic energy and facilitating oscillation of the secondary weight 148 relative to the drive wheel 136. For example, as shown diagrammatically in FIG. 6, the deformable spacer 252 may comprise a spring and a viscous fluid-filled cylinder having a reciprocating piston and a rod.

Figure 7:
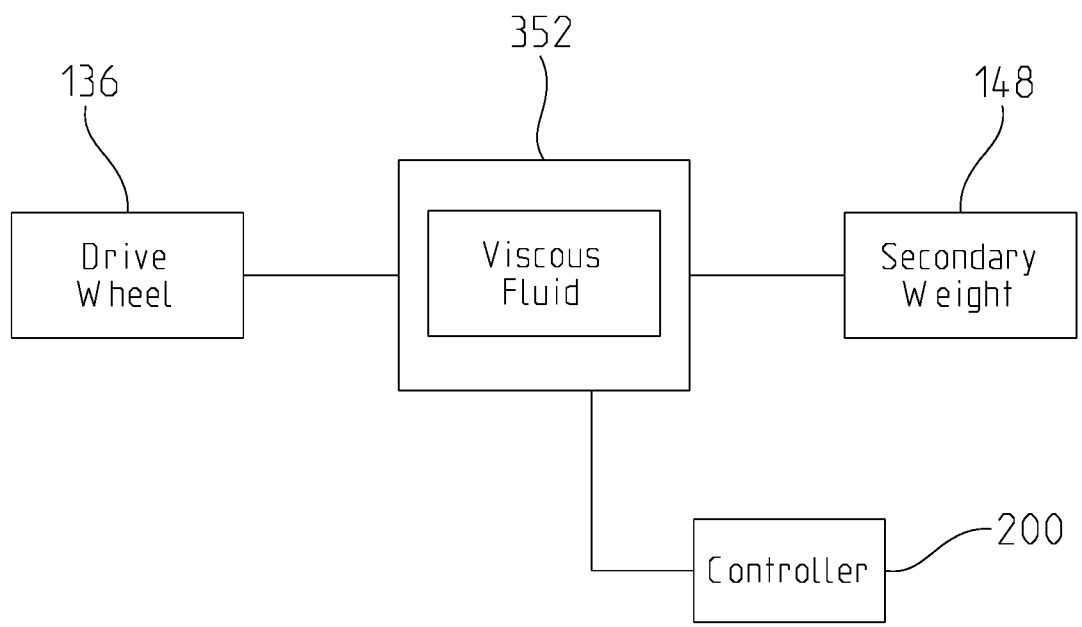
FIG. 7 illustrates a diagrammatic view including another deformable spacer configured to facilitate oscillation of the secondary weight relative to the drive wheel.

In another example, as shown in FIG. 7, the deformable spacer 352 may comprise a viscous fluid that is enclosed by a housing. The viscous fluid may be a fluid comprised of desired material properties, such as the tendency to vary its viscosity in response to temperature variation, electric field variation, and other variables.

In some embodiments, the viscosity of the viscous fluid may vary passively, such as in response to temperature. In some embodiments, the electric field variation may be controlled to vary the viscosity in response to user input. In some embodiments, the electric field variation may be actively controlled to vary the viscosity in response to one or more control factors associated with a frequency of oscillation of the drivable track 144. An exemplary list of such control factors is provided herein.

As shown in FIG. 7, the work machine 100 includes the controller 200, and the controller 200 is configured to identify the one or more control factors associated with the frequency of oscillation of the drivable track 144. Because the drivable track 144 is engaged with the drive wheel 136, the frequency of oscillation of the drivable track 144 contributes to defines the frequency of oscillation of the drive wheel 136. By way of example, control factors associated with the frequency of oscillation of the drivable track 144 include temperature, mass of the drivable track 144, geometry of the drivable track 144, and pressure or position of an actuator configured to adjust the tension of the drivable track 144. The controller 200 is configured to actively adjust a viscosity of the viscous fluid based on the one or more control factors subsequent to their identification.

It should be appreciated that the controller 200 may include a memory and a processor configured to execute instructions stored on the memory. The controller 200 may be a single controller or a plurality of controllers operatively coupled to each other. The controller 200 may be hardwired or connected wirelessly to other components of the work machine 100 via Wi-Fi, Bluetooth, or other known means of wireless communication. The controller 200 may be housed by the work machine 100 or positioned remotely, away from the work machine 100.

Figure 8:
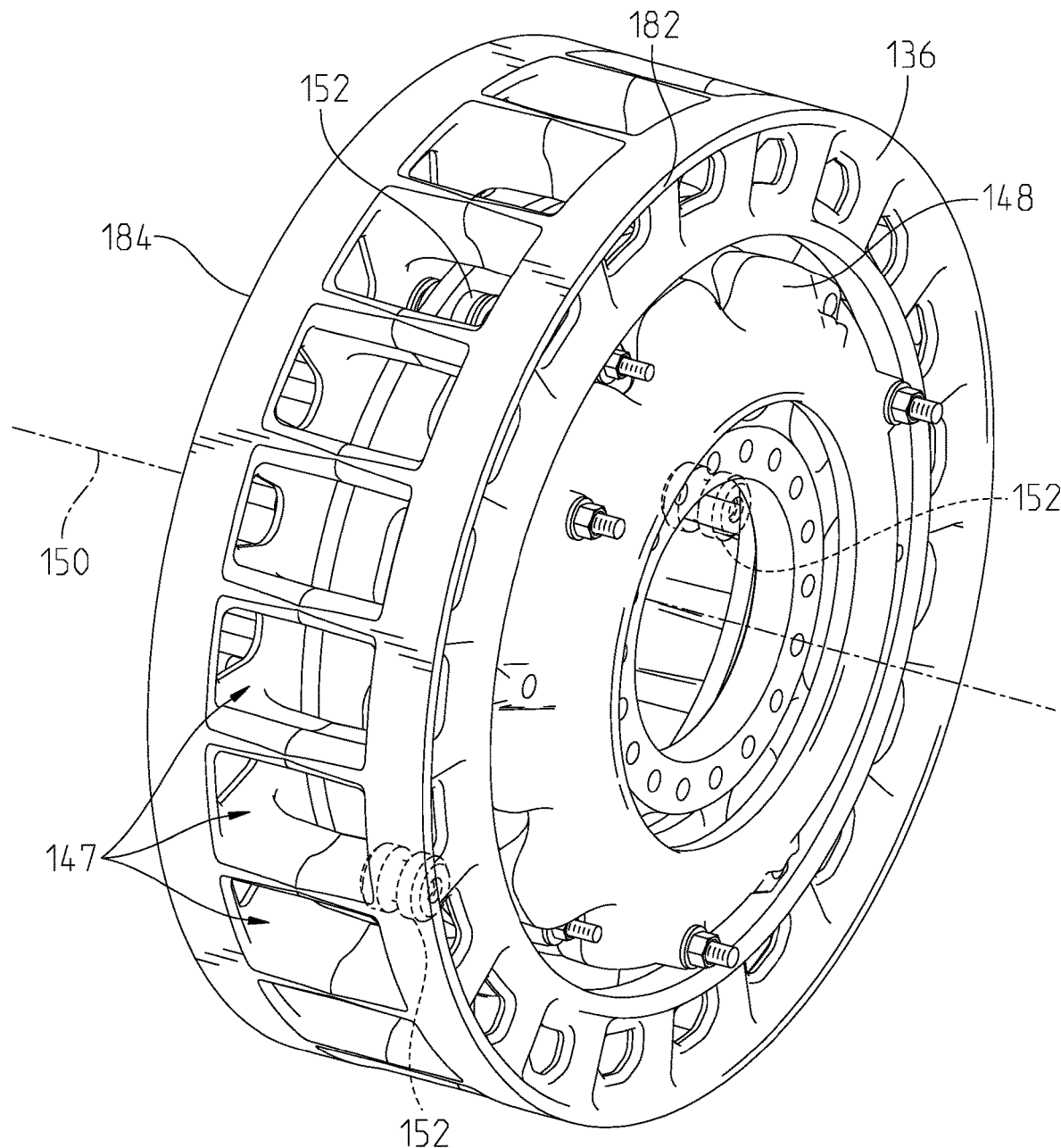
FIG. 8 illustrates a perspective view of a secondary weight coupled to the drive wheel to limit vibrations of the work machine, where the secondary weight is positioned within a footprint of the drive wheel.

Referring now to FIG. 8, in some embodiments, the secondary weight 148 is positioned within the footprint of the drive wheel 136. In other words, the drive wheel 136 includes a first lateral edge 182 and a second lateral edge 184, and the secondary weight 148 is positioned within the first lateral edge 182 and the second lateral edge 184 of the drive wheel 136. This arrangement facilitates rotation of the drive wheel 136 without undesirable aesthetic appearance or interference with other components of the work machine 100 or external objects.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work machine comprising:
a drivable track;
a drive wheel that is configured to rotate about an axis of rotation and is engaged with and configured to cause rotation of the drivable track;
a retainer fixedly coupled to the drive wheel;
an elastomeric spacer coupled to the retainer; and
a secondary weight coupled to the elastomeric spacer;
wherein the secondary weight is configured to rotate with the drive wheel about the axis of rotation.

2. The work machine of claim 1, wherein the elastomeric spacer facilitates oscillation of the secondary weight relative to the drive wheel.

3. The work machine of claim 2, wherein the secondary weight has a rotational inertia associated with a frequency of oscillation of the secondary weight; and
wherein the frequency of oscillation of the secondary weight is within a tolerance of a frequency of oscillation of the drive wheel during rotation of the drivable track.

4. The work machine of claim 3, wherein the secondary weight has a mass associated with an amplitude of oscillation of the secondary weight; and
wherein the amplitude of oscillation of the secondary weight offsets an amplitude of oscillation of the drive wheel during rotation of the drivable track.

5. The work machine of claim 1, wherein the retainer is spaced apart from the secondary weight; and
wherein at least a portion of the elastomeric spacer is positioned between the retainer and the secondary weight.

6. The work machine of claim 1, wherein the elastomeric spacer includes a first portion and a second portion;
wherein the first portion includes: a head, a collar having a lesser perimeter than the head, and a leg having a lesser perimeter than the collar; and
wherein the second portion includes a base having an aperture extending therethrough; and
wherein the aperture of the base is sized and shaped to receive the leg.

7. The work machine of claim 6, wherein the retainer includes an aperture; and
wherein the aperture of the retainer is sized and shaped to receive the collar;
wherein the head, the collar, and the leg define a continuous aperture extending therethrough; and
wherein the continuous aperture is sized and shaped to receive a fastener configured to secure the retainer, the elastomeric spacer, and the secondary weight to each other.

8. The work machine of claim 1, wherein the drive wheel includes a first lateral edge and a second lateral edge; and
wherein the secondary weight is positioned within the first lateral edge and the second lateral edge of the drive wheel.

9. The work machine of claim 1, wherein the retainer, in its entirety, is configured to rotate with the drive wheel about the axis of rotation.

10. The work machine of claim 1, wherein the secondary weight is indirectly coupled to the drive wheel via the retainer.

11. The work machine of claim 1, wherein the elastomeric spacer includes a first portion and a second portion;
wherein the first portion is positioned between the retainer the secondary weight and the second portion is not positioned between the retainer and the secondary weight.

12. The work machine of claim 1, wherein the retainer, the elastomeric spacer, and the secondary weight are coupled together via a fastener that extends through an aperture in the elastomeric spacer.

13. The work machine of claim 1, wherein the axis of rotation extends axially; and
wherein at least a portion of the elastomeric spacer is positioned axially between the retainer and the secondary weight.

14. A work machine comprising:
a drive wheel;
a drivable track engaged with the drive wheel;
a deformable spacer coupled to the drive wheel; and
a secondary weight coupled to the deformable spacer;
wherein the deformable spacer facilitates oscillation of the secondary weight relative to the drive wheel; and
wherein the deformable spacer is comprised of a viscous fluid.

15. The work machine of claim 14, wherein the oscillation of the secondary weight offsets an oscillation of the drive wheel.

16. The work machine of claim 14, further comprising a controller configured to identify one or more control factors associated with a frequency of oscillation of the drivable track;
wherein the controller is configured to actively adjust a viscosity of the viscous fluid based on the identified one or more control factors associated with a frequency of oscillation of the drivable track.

17. The work machine of claim 14, wherein the viscosity of the viscous fluid varies based on temperature.

18. The work machine of claim 9, wherein the drivable track includes a first lateral edge and a second lateral edge; and
wherein the secondary weight is positioned within the first lateral edge and the second lateral edge of the drive track.

19. A method for limiting the vibrations of a work machine comprising:
rotating a drive wheel engaged with a drivable track, wherein the drivable track is disposed at a tension contributing to vibrations of the work machine;
oscillating a secondary weight relative to the drive wheel to limit the vibrations of the work machine;

wherein oscillating a secondary weight relative to the drive wheel includes deforming at least a portion of a deformable spacer coupled to the drive wheel and the secondary weight; and wherein deforming at least a portion of a deformable spacer coupled to the drive wheel and the secondary weight includes adjusting the viscosity of a fluid included in the deformable spacer based on the tension of the drivable track.

20. The method for limiting the vibrations of a work machine of claim 19, further comprising:

determining an amplitude of oscillation of the drive wheel; and selecting a secondary weight having a desired rotational inertia based on the amplitude of oscillation of the drive wheel.

\* \* \* \* \*